Figure 1:
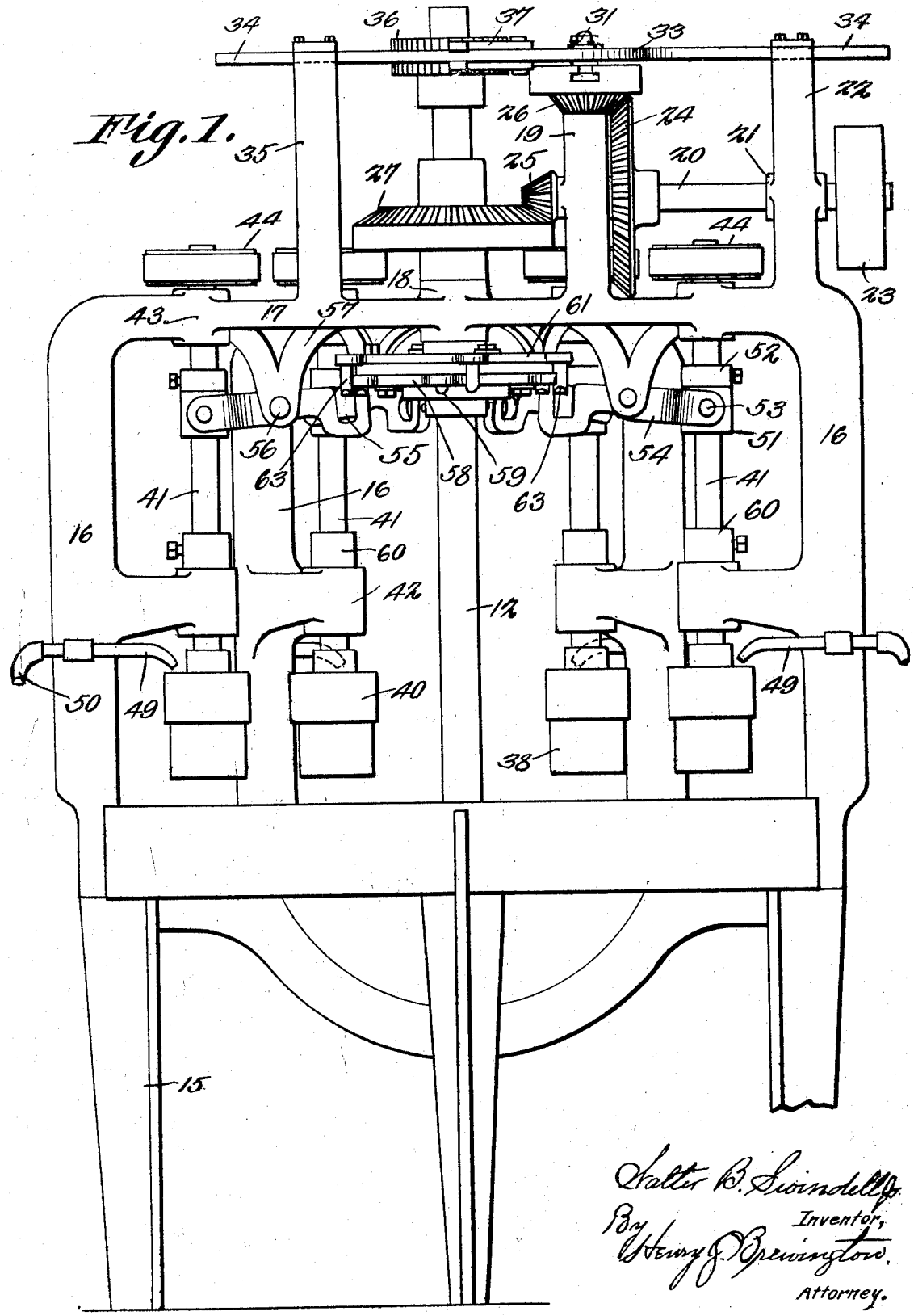

W. B. SWINDELL, Jr.
GRINDING MACHINE.
APPLICATION FILED JAN. 26, 1921.

1,402,911.

Patented Jan. 10, 1922.

4 SHEETS—SHEET 1.

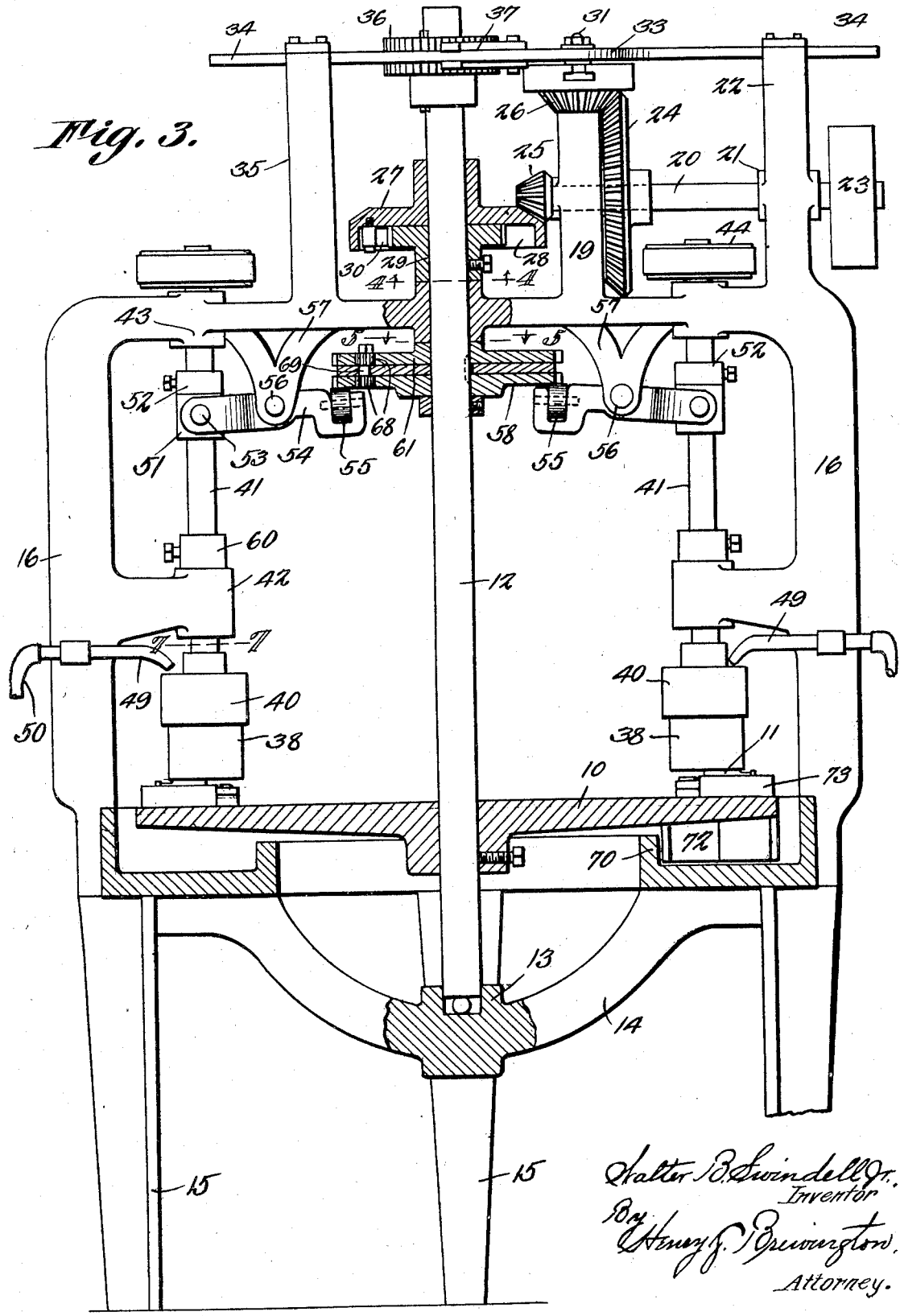

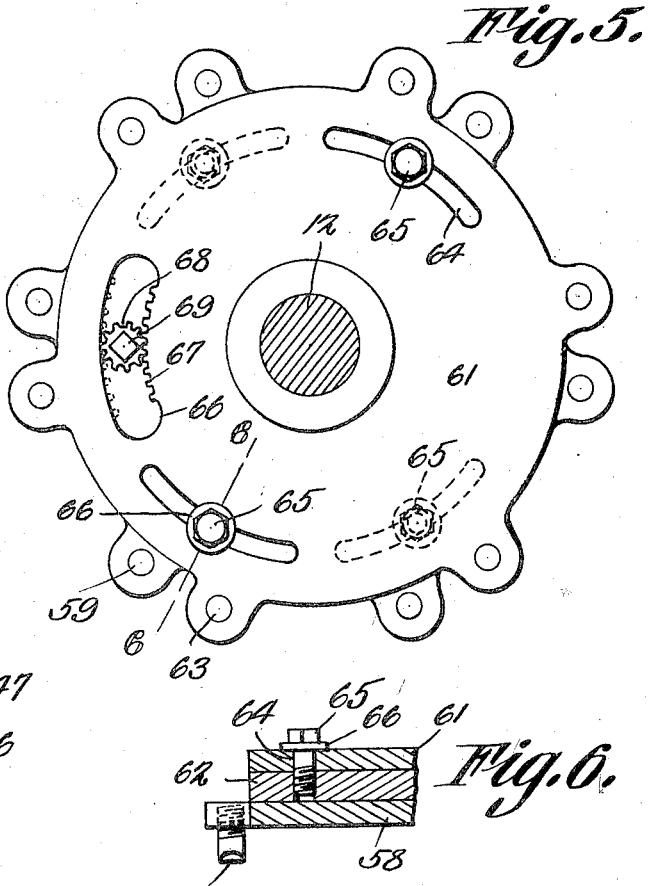

UNITED STATES PATENT OFFICE.

WALTER B. SWINDELL, JR., OF BALTIMORE, MARYLAND.

GRINDING MACHINE.

1,402,911.  Specification of Letters Patent.  Patented Jan. 10, 1922.

Application filed January 26, 1921. Serial No. 439,918.

*To all whom it may concern:*

Be it known that I, WALTER B. SWINDELL, Jr., a citizen of the United States, residing at Baltimore city, State of Maryland, have invented certain new and useful Improvements in Grinding Machines, of which the following is a specification.

The machine which is the subject matter of the present application for patent has been designed more particularly for grinding the sides of glass bottles to remove rough places produced in the process of manufacture, and to impart a smooth and finished surface to the bottle sides. It is to be understood however, that the machine is not limited to the grinding of bottles, but it may be employed with equal facility for grinding other articles, and also articles not necessarily made of glass.

The invention has for its object to provide a very efficient machine of the kind stated, and also one which is rapid in operation, it requiring no attention except to place the bottles or other articles on a work-holder and to remove the same when the grinding operation is finished.

The invention also has for its object to provide a means for adjusting the machine for articles of different sizes.

The objects stated are attained by means of a novel combination and arrangement of parts to be hereinafter described and claimed, and in order that the same may be better understood, reference is had to the accompanying drawings forming a part of this specification.

Figure 2:
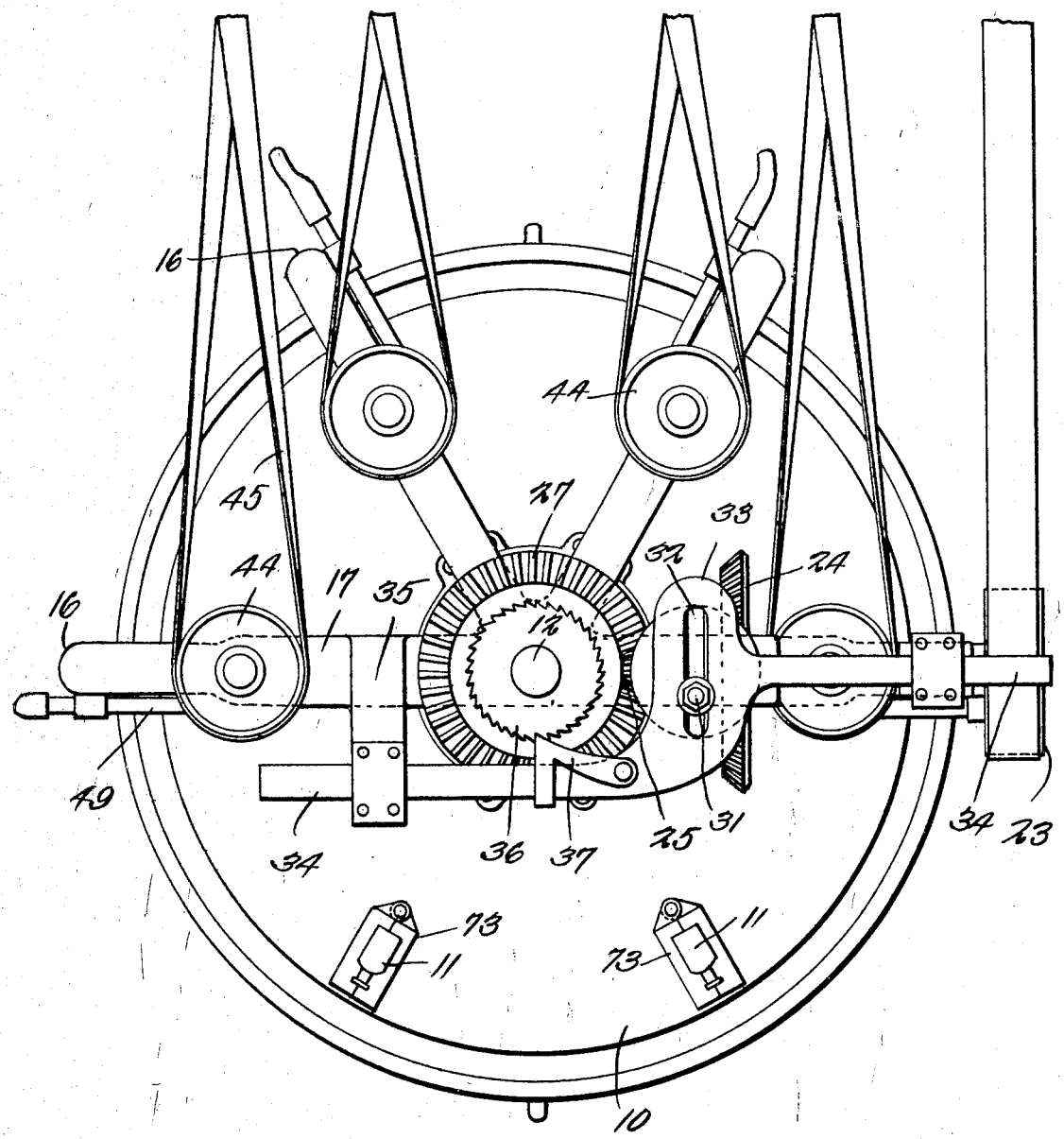

In the drawings,

Figure 1 is an elevation of the machine; Fig. 2 is a plan view thereof; Fig. 3 is a central vertical section; Fig. 4 is a cross-section on the line 4—4 of Fig. 3; Fig. 5 is an enlarged cross-section on the line 5—5 of Fig. 3; Fig. 6 is a sectional detail on the line 6—6 of Fig. 5; Fig. 7 is a cross-section on the line 7—7 of Fig. 3; Fig. 8 is a vertical section on the line 8—8 of Fig. 7, and Fig. 9 is a plan view of a fragment of a work holding table, partly broken away.

Referring specifically to the drawings, 10 denotes a table on which the bottles 11 or other articles to be operated on are supported. This work-supporting table is rotatable, it being carried by a vertical shaft 12 passing centrally therethrough and made fast to said shaft by any suitable means. The shaft 12 is supported at its lower end in a step bearing 13 on the supporting frame 14 of the machine, said frame including legs 15 and uprights 16, the latter supporting certain elements to be presently described. The uprights 16 are connected at the top by a cross head 17 having midway between its ends a bearing 18 for the upper end of the shaft 12.

The cross-head 17 has a bearing standard 19 supporting one end of a horizontal shaft 20 supported at its other end in a bearing 21 on an upward extension 22 of one of the uprights 16. The shaft 20 is shown equipped with a pulley 23 by which it obtains motion from any suitable power source.

On the shaft 20 is a bevel gear 24 and a bevel pinion 25. The bevel gear 24 is in mesh with a bevel pinion 26 supported by the standard 19, and the bevel pinion 25 is in mesh with a bevel gear 27 loose on the shaft 12.

The bottom face of the bevel gear 27 has a recess 28 to seat a ratchet wheel 29 made fast on the shaft 12 by any suitable means. The bevel gear 27 carries, inside its recess 28, a spring pressed pawl 30 which engages the ratchet wheel 29.

It will be evident from the foregoing that when the shaft 20 is driven in the proper direction, its motion is transmitted to the shaft 12 through the pinion 25, the gear 27, the pawl 30 and the ratchet wheel 29. The purpose of the pawl-and-ratchet driving connection is to enable the shaft 12 to be driven by the shaft 20 by another motion-transmitting means and at a higher rate of speed, for a purpose to be presently made clear.

The means for obtaining the aforementioned high-speed drive of the shaft 12 comprise the following elements:

On the upper face of the bevel pinion 26 is a crank or wrist pin 31 which seats in a slot 32 in a cross-head 33 having supporting arms 34 one of which latter is slidably supported in a bearing at the top of the part 22, and the other arm being supported in a bearing at the top of a standard 35 rising from the cross-head 17. It will therefore be seen that the cross-head 33 is reciprocated through the pin-and-slot connection with the pinion 26, when the latter is rotated, said pinion being driven by the shaft 20 through the bevel gear 24. The motion of the cross-head 33, in one direction, is transmitted to the shaft 12 by a pawl-and-ratchet mechanism, the ratchet 36 being on the shaft 12, and the pawl 37 on one of the arms 34 of the cross-head 33. On the return stroke of the cross-head 33, the pawl 37 slips and no motion is transmitted to the shaft. Inasmuch as the gear 24 is larger than the pinion 26, and the gear 27 is larger than the pinion 25, the former pair transmit the motion of shaft 20 at a higher rate of speed than the latter.

The purpose of driving the shaft 12 at two different rates of speed is to rotate the table 10 slowly during the operation of the grinding tools on the work 11, and to rotate the table at a higher rate of speed to feed the work forwardly.

The machine is shown provided with four rotary grinding tools, but any other number of such may be provided. Each grinding tool consists of a vertically positioned cylinder 38 of suitable abrading material, provided with a central opening 39 extending completely therethrough from the top to the bottom. At its upper end, the cylinder 38 is secured to a holder 40 carried by a rotatable vertical spindle 41 supported in bearings 42 and 43 on one the uprights 16. On the upper end of the spindle 41 is a pulley 44 over which passes a belt 45 driven from any power source. It will be understood that any other means may be provided for driving the spindle 41.

The holder 40 has an annular top recess 46 from the bottom of which extend ducts 47 which open into a bottom recess 48 in the holder above the top of the cylinder 38. It will therefore be seen that if water and abrasive material is introduced into the recess 46 it will run through the ducts 47 into the recess 48 and pass down the opening 39 to the bottom of the cylinder, the latter being the working surface. At 49 is shown a nozzle for discharging water into the recess 46, said nozzle being connected to a pipe 50 leading from a suitable source of water supply.

Each abrading cylinder 38 has a driving means as hereinbefore described, and a means is also provided for raising and lowering the cylinder at intervals for a purpose to be presently made clear. The raising and lowering means comprise the following parts:

On the spindle 41 is loosely mounted a sleeve 51 which bears at the top against a set collar or other abutment 52 on the spindle. To the side of the sleeve 51 is pivoted, as shown at 53 one end of a lever 54 carrying at its other end a roller 55. The lever 54 is pivoted intermediate its ends, as shown at 56, to a bracket 57 depending from the cross-head 17, and it is arranged to swing up and down.

Mounted on the shaft 12 is a disk 58 carrying near its periphery a depending pin or other abutment 59 positioned to be intercepted by the roller 55, and when this occurs, the roller-carrying end of the lever 54 is depressed, and the opposite end of the lever rises so that through the sleeve 51 and the abutment 52 the spindle 41 is slid upwardly to elevate the abrading cylinder 38. When the pin 59 clears the roller 55, the weight of the spindle 41 and the parts carried thereby causes the spindle to drop to lower the cylinder 38, with a corresponding movement of the lever 54. The downward movement of the spindle 41 is limited by an adjustable set collar 60 thereon and intercepted by the top of the bearing 42.

Each spindle 41 is provided with the raising and lowering means hereinbefore described, and the disk 58 has a pin 59 for each spindle.

The operation of the raising and lower means of the spindles 41 is so timed that the abrading cylinders 38 are raised slightly as the bottles 11 or other articles approach the latter, this being for the purpose of preventing the bottles from being marred or broken by the cylinders coming in contact with the advancing edge thereof, and as soon as the edge passes under the cylinder, the latter descends into working contact with the bottle. The cylinder 38 is again elevated at the time the bottle is about to pass from beneath the same by the following means:

Mounted on the shaft 12 above the disk 58 is a similar disk 61, and between these two disks is a third disk 62 which is made fast to the shaft 12 to turn therewith. The disk 61 carries depending pins 63 for the same purpose as the pins 59.

The pins 59 and 63 are arranged in pairs as clearly shown in Fig. 5, and the angular distance between the members of said pairs of pins may be varied by a relative rotary movement of the disks 58 and 61 carrying the same, this being for the purpose of timing the two lifting motions of the abrading cylinders 38, it being understood that intervals between the upward movements of the cylinders to clear the opposite edges of the work 11 as hereinbefore described vary in length with the distance between said edges. When operating on small bottles the two upward movements must take place in more rapid succession than when larger bottles are operated on.

The adjustment of the disks 58 and 61 to vary the distance between the pins 59 and 63 for the purpose stated is made possible by providing said disks with arcuate slots 64 through which pass screw bolts 65 under the heads of which are washers 66 which bear against the exposed faces of the disks. The bolts 65 are screwed into the disk 62, and hence they also serve to couple to the latter disk the disks 58 and 61 so that they turn with the disk 62.

To facilitate the rotation of the disks 58 and 61 relative to each other for adjusting the distance between the pins 59 and 63, said disks are provided with arcuate slots 66 having racks 67 on one side which are in mesh with pinions 68 on a spindle 69 carried by the intermediate disk 62. The spindle 69 projects from the top disk 61 for application of a wrench or other tool. Upon rotating the spindle 69 in one direction, the disks 58 and 61 are rotated in opposite directions to spread the pins 59 and 63 farther apart, and when the spindle is rotated in the opposite direction the disks are rotated to bring the pins closer together. Before this adjustment is made, the bolts 65 must be backed sufficiently to release the disks 58 and 61, and after the adjustment is made the bolts are operated to lock the disks relative to each other and also to the disk 62.

Beneath the work-supporting table 10 is located an annular trough 70 to collect the grinding material and water shed over the edge of the table. The trough 70 has a bottom outlet 71 and on the under side of the table is a V-shaped depending wing 72 which travels around in the trough when the table is in motion and acts as a scraper to force the water and grinding material in the trough to the outlet.

The table 10 carries suitable holders 73 for the bottles 11, the latter being so positioned that their sides which are to be operated on are uppermost.

In operation, the bottles 11 are carried, one after the other, by the rotating table 10 to the abrading cylinders 38, each cylinder operating on a bottle as it comes beneath the same. The relative positions of the work holders 73 and the cylinders 38 are such that the cylinders all operate simultaneously, each one operating on a bottle. There are more work holders 73 than abrading cylinders 38, and hence the bottles may be placed into and removed from the work holders which are not in operative position relative to the cylinders. The bottles can be readily placed into and removed from the holders 73, as this can be done when the table is rotating slowly. As pointed out hereinbefore, the table rotates continuously, but it moves alternately at different rates of speed, the grinding operation taking place during the slow movement, and the feed during the fast movement. When the slow movement is given the table through the gears 25 and 27, the pawl 30 and the ratchet 29, the pawl 37 is slipping, whereas when the pawl 37 is in operation to give the fast movement, the pawl 30 slips. The motion of the shaft 12 carrying the table is therefore continuous and in one direction, but it runs alternately at a different rate of speed.

I claim:

1. An abrading machine comprising a rotatable work holder, a plurality of rotatable abrading tools, and a variable speed driving means for rotating the work holder to feed the work to the abrading tools in succession, the rotation of the work holder continuing during the position of the work in operative relation with respect to the tool, but at a slower rate of speed.

2. An abrading machine comprising a traveling work holder, a rotary abrading tool, and a variable speed driving means for operating the work holder to carry the work past the abrading tool in operating position relative thereto, the rate of speed at which the work holder travels when the work is in operative position relative to the tool being less than the rate of its speed when the work is approaching and leaving its operative position relative to the tool.

3. An abrading machine comprising a traveling work holder, a rotary abrading tool, a variable speed driving means for operating the work holder to carry the work past the abrading tool in operating position relative thereto, the rate of speed at which the work holder travels when the work is in operative position relative to the tool being less than the rate of its speed when the work is approaching and leaving its operative position relative to the tool, and means for elevating the tool clear of the work at the commencement and at the end of the operative position of the same.

4. An abrading machine comprising a rotatable work holder, a plurality of rotatable abrading tools, a variable speed driving means for rotating the work holder to feed the work to the abrading tools in succession, the rotation of the work holder continuing during the position of the work in operative relation with respect to the tool, and means for elevating the tools clear of the work at the commencement and at the end of its operative position.

5. An abrading machine comprising a rotatable work holder, a plurality of rotatable abrading tools, means for rotating the work holder to feed the work to the abrading tools in succession, the rotation of the work holder continuing during the position of the work in operative relation with respect to the tool, but at a slower rate of speed, and means for elevating the tools clear of the work at the commencement and at the end of its operative position.

6. An abrading machine comprising a rotatable work holder, a shaft carrying said work holder, a pawl-and-ratchet mechanism operating to rotate the shaft, a second pawl-and-ratchet mechanism also operating to rotate the shaft, means for actuating said mechanisms in alternate order and at different rates of speed to impart a continuous rotary movement to the shaft at different rates of speed alternately, and a rotary abrading tool past which the work is carried by the work holder.

7. An abrading machine comprising a rotatable work holder, a shaft carrying said work holder, a pawl-and-ratchet mechanism operating to rotate the shaft, a second pawl-and-ratchet mechanism also operating to rotate the shaft, means for actuating said mechanisms in alternate order and at different rates of speed to impart a continuous rotary movement to the shaft at different rates of speed alternately, a rotary abrading tool past which the work is carried by the work holder, said tool being slidable in a direction toward and from the work, and means for sliding the tool clear of the work at the commencement and at the end of its operative position relative to the tool.

8. An abrading machine comprising a rotatable work holder, a shaft carrying said work holder, a pawl-and-ratchet mechanism operating to rotate the shaft, a second pawl-and-ratchet mechanism also operating to rotate the shaft, means for actuating said mechanisms in alternate order and at different rates of speed to impart a continuous rotary movement to the shaft at different rates of speed alternately, a rotary abrading tool past which the work is carried by the work holder, a rotatable spindle having supporting means for the tool, said spindle being slidably supported to carry the tool toward and from the work, a lever having an operative connection with the spindle for effecting its sliding movement, and a member carried by the aforesaid shaft to turn therewith, and having abutments intercepted by the lever for actuating the same.

9. An abrading machine comprising a rotatable work holder, a shaft carrying said work holder, a pawl-and-ratchet mechanism operating to rotate the shaft, a second pawl-and-ratchet mechanism also operating to rotate the shaft, means for actuating said mechanisms in alternate order and at different rates of speed to impart a continuous rotary movement to the shaft at different rates of speed alternately, a rotary abrading tool past which the work is carried by the work holder, a rotatable spindle having supporting means for the tool, said spindle being slidably supported to move the tool clear of the work at the commencement and at the end of its operative position relative to the tool, a lever having an operative connection with the spindle for effecting such sliding movement, a member carried by the aforesaid shaft to turn therewith, and a pair of abutments on said member intercepted sucessively by the lever for actuating the same, said abutments being adjustable relative to each other to vary the distance therebetween.

10. An abrading machine comprising a rotatable work holder, a shaft carrying said work holder, means for imparting to the shaft a continuous rotary movement at different rates of speed alternately, and a rotary abrading tool past which the work is carried by the work holder.

11. An abrading machine comprising a rotatable work holder, a shaft carrying said work holder, means for imparting to the shaft a continuous rotary movement at different rates of speed alternately, a rotary abrading tool past which the work is carried by the work holder, said tool being slidable in a direction toward and from the work, and means for sliding the tool clear of the work at the commencement and at the end of its operative position relative to the tool.

12. An abrading machine comprising a rotatable work holder, a shaft carrying said work holder, means for imparting to the shaft a continuous rotary movement at different rates of speed alternately, a rotary abrading tool past which the work is carried by the work holder, a rotatable spindle having supporting means for the tool, said spindle being slidably supported to carry the tool toward and from the work, a lever having an operative connection with the spindle for effecting its sliding movement, and a member carried by the aforesaid shaft to turn therewith, and having abutments intercepted by the lever for actuating the same.

13. An abrading machine comprising a rotatable work holder, a shaft carrying said work holder, means for imparting to the shaft a continuous rotary movement at different rates of speed alternately, a rotary abrading tool past which the work is carried by the work holder, a rotatable spindle having supporting means for the tool, said spindle being slidably supported to move the tool clear of the work at the commencement and at the end of its operative position relative to the tool, a lever having an operative connection with the spindle for effecting such sliding movement, a member carried by the aforesaid shaft to turn therewith, and a pair of abutments on said member intercepted successively by the lever for actuating the same, said abutments being adjustable relative to each other to vary the distance therebetween.

14. An abrading machine comprising a rotatable work holder, a shaft carrying the work holder, a bevel gear loose on the shaft, a pawl-and-ratchet driving connection between the bevel gear and the shaft, a pinion in mesh with the bevel gear, a drive shaft carrying the pinion, a ratchet wheel fast on the work table shaft, a pawl engaging said ratchet wheel, a reciprocating slotted crosshead carrying said pawl, a bevel pinion having a crank pin working in the slot of the cross head, a bevel gear on the aforesaid pinion drive shaft and in mesh with the last-mentioned pinion, and a rotary abrading tool in operative position relative to the work holder.

15. An abrading machine comprising a rotatable work holder, a shaft carrying the work holder, a bevel gear loose on the shaft, a pawl-and-ratchet driving connection between the bevel gear and the shaft, a pinion in mesh with the bevel gear, a drive shaft carrying the pinion, a ratchet wheel fast on the work table shaft, a pawl engaging said ratchet wheel, a reciprocating slotted cross head carrying said pawl, a bevel pinion having a crank pin working in the slot of the cross head, a bevel gear on the aforesaid pinion drive shaft and in mesh with the last-mentioned pinion, a rotary abrading tool in operative position relative to the work holder, said tool being slidable in a direction toward and from the work, and means for sliding the tool clear of the work at the commencement and at the end of its operative position relative to the tool.

16. An abrading machine comprising a rotatable work holder, a shaft carrying the work holder, a bevel gear loose on the shaft, a pawl-and-ratchet driving connection between the bevel gear and the shaft, a pinion in mesh with the bevel gear, a drive shaft carrying the pinion, a ratchet wheel fast on the work table shaft, a pawl engaging said ratchet wheel, a reciprocating slotted crosshead carrying said pawl, a bevel pinion having a crank pin working in the slot of the cross head, a bevel gear on the aforesaid pinion drive shaft and in mesh with the last-mentioned pinion, a rotary abrading tool in operative position relative to the work holder, a rotatable spindle having supporting means for the tool, said spindle being slidably supported to carry the tool toward and from the work, a lever having an operative connection with the spindle for effecting its sliding movement, and a member carried by the aforesaid shaft to turn therewith, and having abutments intercepted by the lever for actuating the same.

17. An abrading machine comprising a rotatable work holder, a shaft carrying the work holder, a bevel gear loose on the shaft, a pawl-and-ratchet driving connection between the bevel gear and the shaft, a pinion in mesh with the bevel gear, a drive shaft carrying the pinion, a ratchet wheel fast on the work table shaft, a pawl engaging said ratchet wheel, a reciprocating slotted crosshead carrying said pawl, a bevel pinion having a crank pin working in the slot of the cross head, a bevel gear on the aforesaid pinion drive shaft and in mesh with the last-mentioned pinion, a rotary abrading tool in operative position relative to the work holder, a rotatable spindle having supporting means for the tool, said spindle being slidably supported to move the tool clear of the work at the commencement and at the end of its operative position relative to the tool, a lever having an operative connection with the spindle for effecting such sliding movement, a member carried by the aforesaid shaft to turn therewith, and a pair of abutments on said member intercepted successively by the lever for actuating the same, said abutments being adjustable relative to each other to vary the distance therebetween.

18. An abrading machine comprising a rotatable work holder, a shaft carrying the work holder, a rotary abrading tool, means for operating the shaft to carry the work past the abrading tool, said tool being slidable in a direction toward and from the work, and means for sliding the tool clear of the work at the commencement and at the end of its operative position relative to the tool.

19. An abrading machine comprising a rotatable work holder, a shaft carrying the work holder, a rotary abrading tool, means for operating the shaft to carry the work past the abrading tool, a rotatable spindle having supporting means for the tool, said spindle being slidably supported to carry the tool toward and from the work, a lever having an operative connection with the spindle for effecting its sliding movement, and a member carried by the aforesaid shaft to turn therewith, and having abutments intercepted by the lever for actuating the same.

20. An abrading machine comprising a rotatable work holder, a shaft carrying the work holder, a rotary abrading tool, means for operating the shaft to carry the work past the abrading tool, a rotatable spindle having supporting means for the tool, said spindle being slidably supported to move the tool clear of the work at the commencement and at the end of its operative position relative to the tool, a lever having an operative connection with the spindle for effecting such sliding movement, a member carried by the aforesaid shaft to turn therewith, and a pair of abutments on said member intercepted successively by the lever for actuating the same, said abutments being adjustable relative to each other to vary the distance therebetween.

21. An abrading machine comprising a rotatable work holder, a shaft carrying the work holder, a rotary abrading tool, means for operating the shaft to carry the work past the abrading tool, a rotatable spindle having supporting means for the tool, said spindle being slidably supported to carry the tool toward and from the work, a lever having an operative connection with the spindle for effecting its sliding movement, a disk carried by the aforesaid shaft to turn therewith, a pair of disks loosely positioned on the shaft on opposite sides of the first mentioned disk, said pair of disks being rotatable relative to each other, means for locking said pair of disks to the first-mentioned disk, and an abutment carried by each one of the pair of disks, said abutments being positioned for interception by the aforesaid lever.

In testimony whereof I affix my signature.

WALTER B. SWINDELL, Jr.